United States Patent
Inui

(12) 
(10) Patent No.: US 11,400,603 B2
(45) Date of Patent: Aug. 2, 2022

(54) END EFFECTOR DEVICE AND ROBOTIC DEVICE

(71) Applicant: KYOCERA Document Solutions Inc., Osaka (JP)

(72) Inventor: Hiroshi Inui, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 103 days.

(21) Appl. No.: 16/811,838

(22) Filed: Mar. 6, 2020

(65) Prior Publication Data

US 2020/0306992 A1 Oct. 1, 2020

(30) Foreign Application Priority Data

Mar. 29, 2019 (JP) .............................. JP2019-067487

(51) Int. Cl.
*B25J 15/00* (2006.01)
*B25J 9/16* (2006.01)
*B25J 15/10* (2006.01)

(52) U.S. Cl.
CPC ......... *B25J 15/0028* (2013.01); *B25J 9/1612* (2013.01); *B25J 15/10* (2013.01)

(58) Field of Classification Search
CPC .. B25J 9/1612; B25J 15/0028; B25J 15/0033; B25J 15/0042; B25J 15/086; B25J 15/10; B25J 15/103; B25J 15/106; B25J 15/0253; B25J 15/00; B25J 15/08; B25J 18/00

See application file for complete search history.

(56) References Cited

U.S. PATENT DOCUMENTS

| | | | |
|---|---|---|---|
| 2011/0089709 A1* | 4/2011 | Neeper | B66C 1/44 294/119.1 |
| 2012/0175904 A1* | 7/2012 | Murakami | B25J 15/08 294/213 |
| 2012/0286536 A1* | 11/2012 | Murakami | B25J 15/12 294/213 |
| 2013/0341945 A1* | 12/2013 | Saka | B25J 15/08 294/207 |
| 2016/0073584 A1* | 3/2016 | Davidson | B25J 9/1697 56/328.1 |

(Continued)

FOREIGN PATENT DOCUMENTS

| | | |
|---|---|---|
| CN | 106584494 A | 4/2017 |
| CN | 109483582 A | 3/2019 |

(Continued)

OTHER PUBLICATIONS

Extended European search report issued by the European Patent Office dated May 4, 2020, which corresponds to European Patent Application No. 20161405.4-1016 and is related to U.S. Appl. No. 16/811,838.

*Primary Examiner* — Stephen A Vu
(74) *Attorney, Agent, or Firm* — Studebaker & Brackett PC

(57) ABSTRACT

An end effector device includes a housing having an opening, a first gripper, and a second gripper. The first gripper includes a first finger and a second finger facing each other and configured to open and close. The second gripper includes a third finger and a fourth finger facing each other and configured to open and close in a direction intersecting the first gripper. The first finger, the second finger, the third finger, and the fourth finger each protrude from the opening.

5 Claims, 3 Drawing Sheets

(56) References Cited

U.S. PATENT DOCUMENTS

| | | | |
|---|---|---|---|
| 2016/0278872 A1* | 9/2016 | Gombert | A61B 34/72 |
| 2018/0169870 A1* | 6/2018 | Nakayama | B25J 15/0033 |
| 2020/0171677 A1* | 6/2020 | Endo | B25J 13/082 |

FOREIGN PATENT DOCUMENTS

| | | | |
|---|---|---|---|
| JP | S54-95453 A | 7/1979 |
| JP | 2010-094804 A | 4/2010 |
| JP | 2010280045 A | 12/2010 |

* cited by examiner

END EFFECTOR DEVICE AND ROBOTIC DEVICE

INCORPORATION BY REFERENCE

The present application claims priority under 35 U.S.C. § 119 to Japanese Patent Application No. 2019-067487, filed on Mar. 29, 2019. The contents of this application are incorporated herein by reference in their entirety.

BACKGROUND

The present disclosure relates to an end effector device and a robotic device.

A robot hand device drives a finger mechanism with a single motor. The finger mechanism includes a base linkage member and a distal linkage member. A work is gripped by a pair of finger mechanisms.

A known robotic device includes an end effector device and a robot hand device configured to drive the end effector device. The end effector device is exchangeably connected to a distal end of the robot hand device. An end effector device has two or three fingers to realize a work gripping function.

SUMMARY

An end effector device according to an aspect of the present disclosure includes a housing having an opening, a first gripper, and a second gripper. The first gripper includes a first finger and a second finger facing each other and configured to open and close. The second gripper includes a third finger and a fourth finger facing each other and configured to open and close in a direction intersecting the first gripper. The first finger, the second finger, the third finger, and the fourth finger each protrude from the opening.

The robotic device according to the present disclosure includes the end effector device and a robot hand device configured to drive the end effector device.

DETAILED DESCRIPTION

Figure 1:
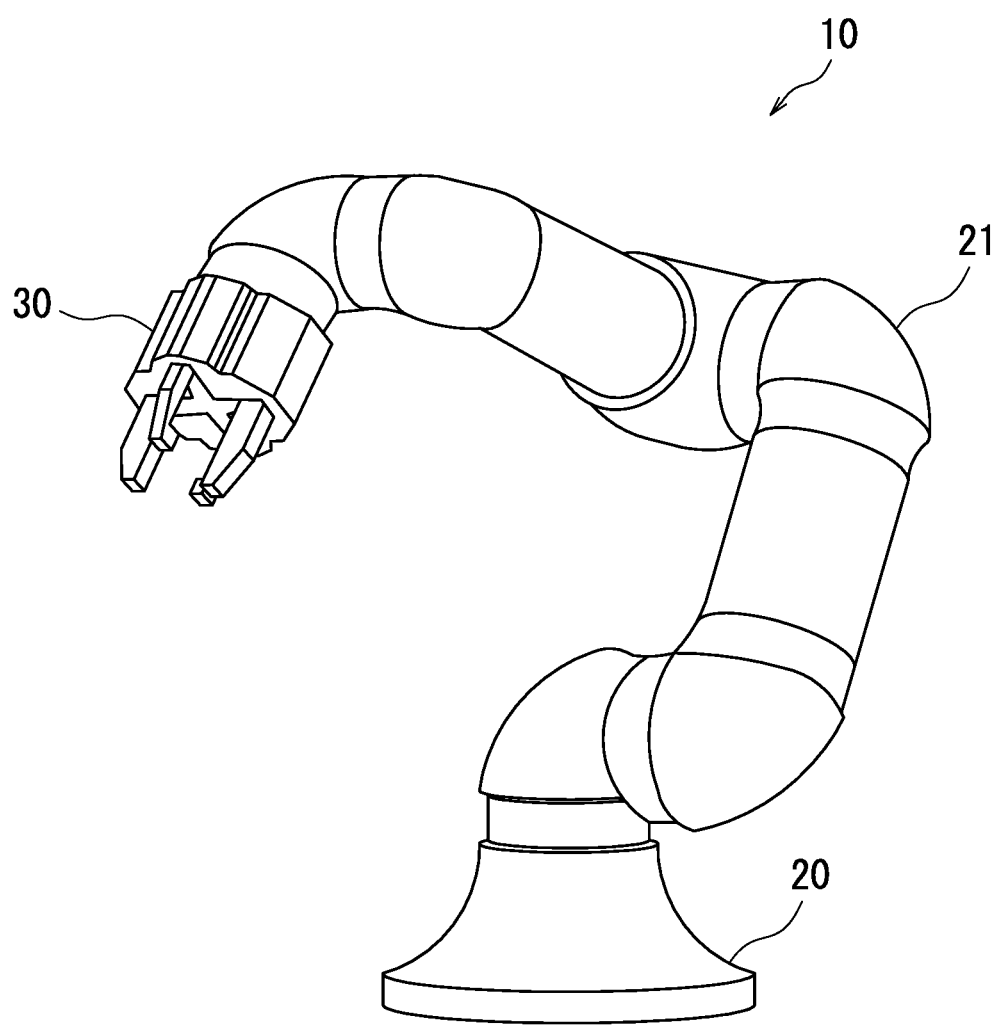
FIG. 1 is a perspective view of an example of the robotic device according to an embodiment of the present disclosure.

The following describes an embodiment of the present disclosure with reference to FIGS. 1 to 5. Elements which are the same or equivalent are labeled with the same reference signs in the drawings and description thereof is not repeated.

First, a robotic device 10 according to the embodiment will be described with reference to FIG. 1. FIG. 1 is a perspective view of an example of the robotic device 10 according to the embodiment.

As illustrated in FIG. 1, the robotic device 10 includes a base 20, a robot hand device 21, and an end effector device 30.

The robot hand device 21 is disposed on the base 20. The robot hand device 21 has multiple axes to drive the end effector device 30. The end effector device 30 is exchangeably connected to a distal end corresponding to a wrist of the robot hand device 21.

Figure 2:
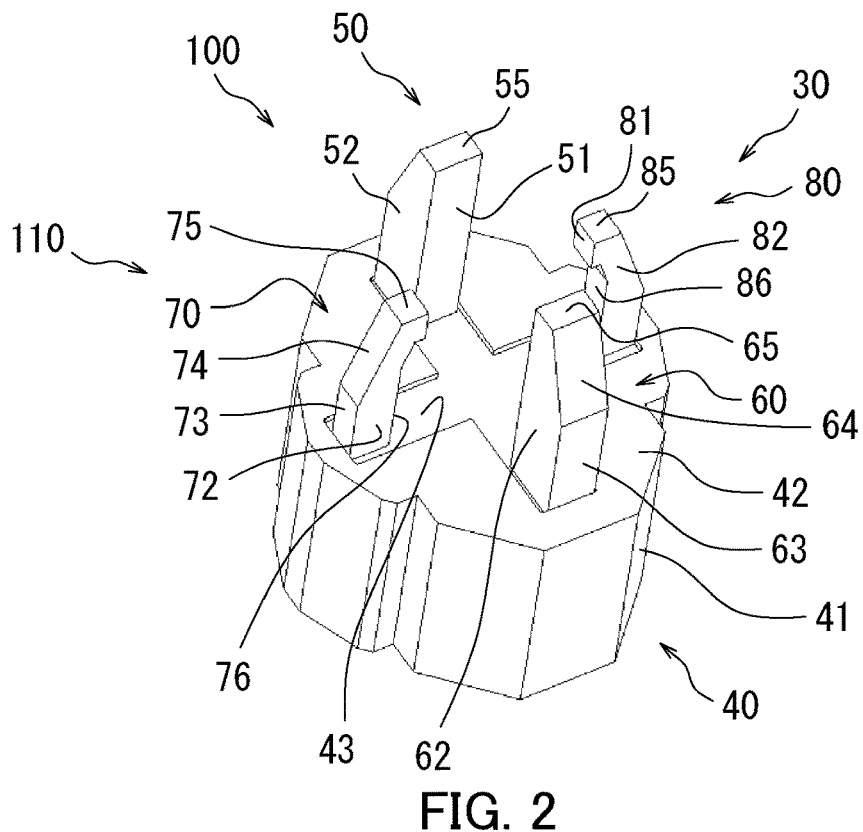
FIG. 2 is a perspective view of an example of the end effector device.
Figure 3:
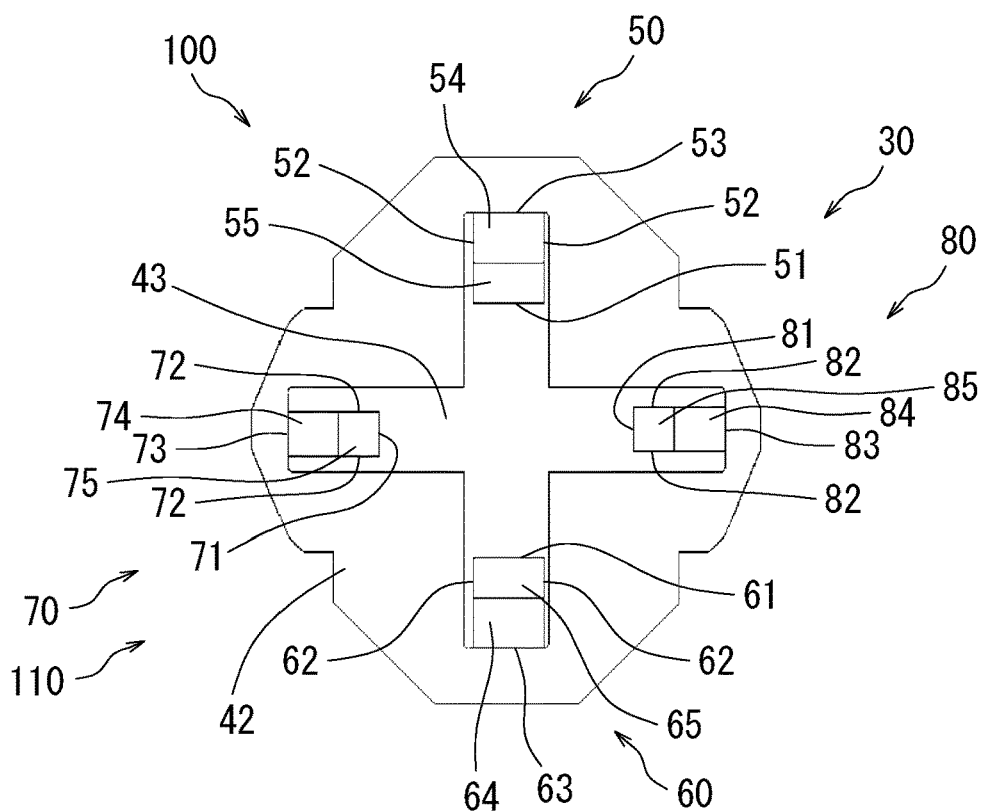
FIG. 3 is a bottom view of the end effector device.

Next, the end effector device 30 will be described with reference to FIGS. 1, 2, and 3. FIG. 2 is a perspective view of an example of the end effector device 30. FIG. 3 is a bottom view of the end effector device 30.

As illustrated in FIGS. 2 and 3, the end effector device 30 includes a housing 40, a first gripper 100, and a second gripper 110.

The housing 40 is formed in a substantially columnar shape around a central axis, and includes a peripheral side surface 41 and a bottom surface 42. The bottom surface 42 includes an opening 43. The opening 43 is formed in a cross shape so as to have two guide paths intersecting each other.

The first gripper 100 includes a first finger 50 and a second finger 60 facing each other and configured to open and close. The second gripper 110 includes a third finger 70 and a fourth finger 80 facing each other and configured to open and close in a direction intersecting the first gripper 100. The first finger 50, the second finger 60, the third finger 70, and the fourth finger 80 each protrude from the opening 43.

The first finger 50 and the second finger 60 are in substantially symmetric positions about the center axis of the housing 40 and move linearly so that the distance therebetween is increased or reduced in one of the guide paths of the opening 43. The housing 40 includes therewithin a first motor and a first drive mechanism not illustrated. The first drive mechanism includes for example a rack and a pinion for converting a rotational motion of the first motor into a linear motion. The first finger 50 and the second finger 60 are driven by the first drive mechanism.

The third finger 70 and the fourth finger 80 are in substantially symmetric positions about the center axis of the housing 40 and move linearly so that the distance therebetween is increased or reduced in the other guide path of the opening 43. The housing 40 includes therewithin a second motor and a second drive mechanism not illustrated. The second drive mechanism includes for example a rack and a pinion for converting a rotational motion of the second motor into a linear motion. The third finger 70 and the fourth finger 80 are driven by the second drive mechanism independently of the first finger 50 and the second finger 60. Note that the first motor and the second motor may be replaced with a common motor.

In the end effector device 30 illustrated in FIGS. 2 and 3, the length of the first finger 50 and the second finger 60 protruding from the opening 43 is substantially the same as the length of the third finger 70 and the fourth finger 80 protruding from the opening 43. Further, the maximum distance between the first finger 50 and the second finger 60 is substantially the same as the maximum distance between the third finger 70 and the fourth finger 80.

The first finger 50 is formed in a rod shape having a rectangular cross section, and has a work contact surface 51, two side surfaces 52, a back surface 53, a sloping surface 54, and a top surface 55. The work contact surface 51 is formed in an elongated rectangular shape. Each of the side surfaces 52 is formed in an elongated pentagonal shape, and bounded by the work contact surface 51, the back surface 53, the sloping surface 54, and the top surface 55. The back surface 53 is formed in a rectangular shape smaller than the work contact surface 51, and bounded by the two side surfaces 52 and the sloping surface 54. The sloping surface 54 is bounded by the two side surfaces 52, the back surface 53, and the top surface 55. The top surface 55 is bounded by the work contact surface 51, the two side surfaces 52, and the sloping surface 54.

The second finger 60 is formed symmetrically with the first finger 50, and has a work contact surface 61, two side surfaces 62, a back surface 63, a sloping surface 64, and a top surface 65.

The third finger 70 is formed in an elongated hook shape and has a work contact surface 71, two side surfaces 72, a back surface 73, a sloping surface 74, and a facing surface 76. The work contact surface 71 is formed in a small rectangular shape. Each of the side surfaces 72 is formed in an arc shape, and bounded by the work contact surface 71, the back surface 73, the sloping surface 74, the top surface 75, and the facing surface 76. The back surface 73 is formed in a rectangular shape larger than the work contact surface 71, and bounded by the two side surfaces 72 and the sloping surface 74. The sloping surface 74 is bounded by the two side surfaces 72, the back surface 73, and the top surface 75. The top surface 75 is bounded by the work contact surface 71, the two side surfaces 72, and the sloping surface 74. The facing surface 76 is bounded by the work contact surface 71 and the two side surfaces 72.

The fourth finger 80 is formed symmetrically with the third finger 70, and has a work contact surface 81, two side surfaces 82, a back surface 83, a sloping surface 84, a top surface 85, and a facing surface 86.

Using the end effector device 30 illustrated in FIGS. 2 and 3, the first gripper 100 including the first finger 50 and the second finger 60 can grip a type of work. In addition, the second gripper 110 including the third finger 70 and the fourth finger 80 can grip another type of work. Further, the first gripper 100 and the second gripper 110 can be driven so as to simultaneously grip a common work.

The work contact surface 51 of the first finger 50 and the work contact surface 61 of the second finger 60 may be made of material different from that of the work contact surface 71 of the third finger 70 and the work contact surface 81 of the fourth finger 80. For example, a member made of a soft and flexible material may be attached to only the work contact surface 51 of the first finger 50 and the work contact surface 61 of the second finger 60 in order to prevent the work from being damaged or slipping.

Figure 4:
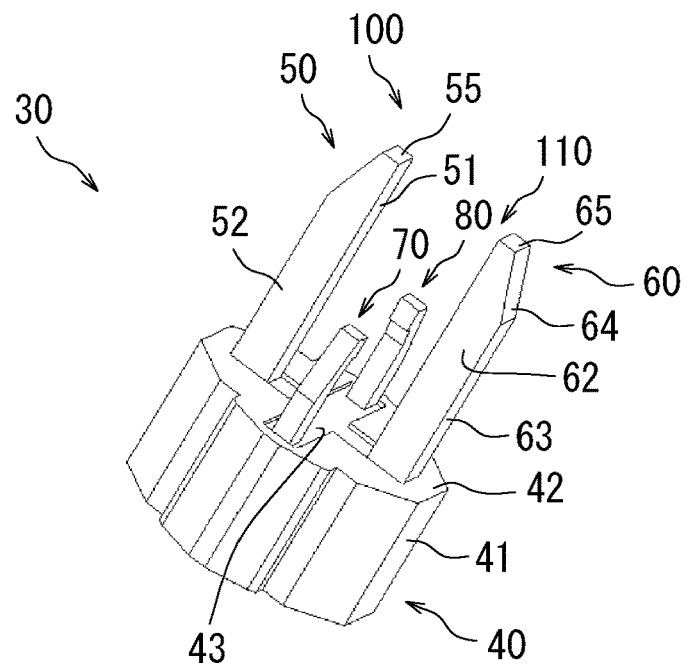
FIG. 4 is a perspective view illustrating a variation of the end effector device.

Next, a variation of the end effector device 30 will be described with reference to FIGS. 1 and 4. FIG. 4 is a perspective view illustrating a variation of the end effector device 30.

The end effector device 30 illustrated in FIG. 4 is different from the end effector device 30 illustrated in FIGS. 2 and 3 in that the length of the first finger 50 and the second finger 60 protruding from the opening 43 is longer than the length of the third finger 70 and the fourth finger 80 protruding from the opening 43. The end effector device 30 illustrated in FIG. 4 can be realized by replacing only the first finger 50 and the second finger 60 of the end effector device 30 illustrated in FIGS. 2 and 3.

In the end effector device 30 illustrated in FIG. 4, the first gripper 100 and the second gripper 110 are selectively used depending on the shape of the work to be gripped.

Figure 5:
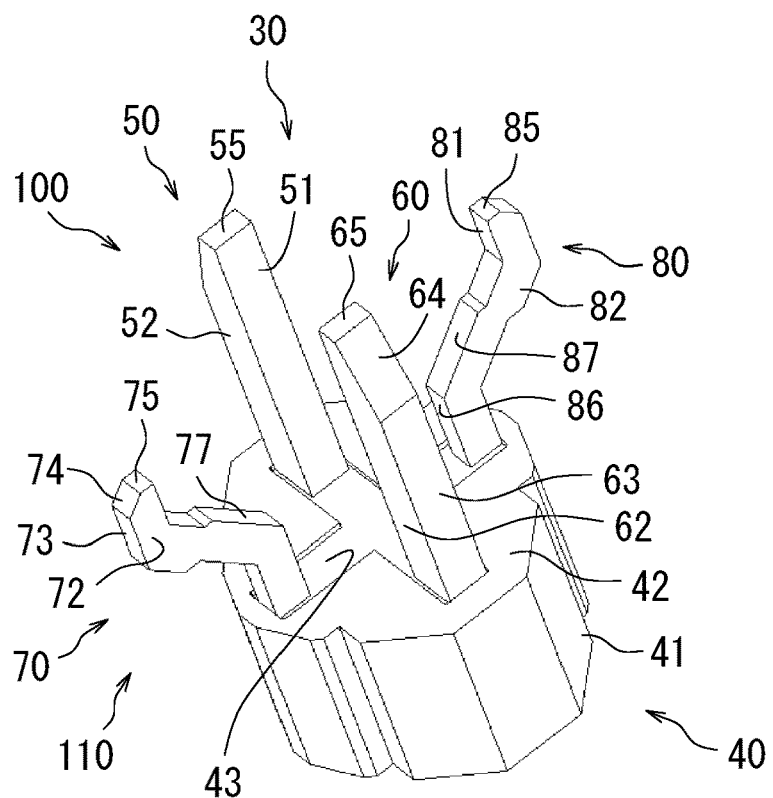
FIG. 5 is a perspective view illustrating another variation of the end effector device.

Next, another variation of the end effector device 30 will be described with reference to FIGS. 1 and 5. FIG. 5 is a perspective view illustrating another variation of the end effector device 30.

The end effector device 30 illustrated in FIG. 5 is different from the end effector device 30 illustrated in FIG. 4 in that the maximum distance between the first finger 50 and the second finger 60 is shorter than the maximum distance between the third finger 70 and the fourth finger 80. The end effector device 30 illustrated in FIG. 5 can be realized by replacing only the third finger 70 and the fourth finger 80 of the end effector device 30 illustrated in FIG. 4.

The third finger 70 illustrated in FIG. 5 is different from the third finger 70 illustrated in FIG. 4 in that the third finger 70 in FIG. 5 has greatly bent side surfaces 72 formed in an S-shape and an inwardly sloping surface 77 bounded by the side surfaces 72. The fourth finger 80 illustrated in FIG. 5 is different from the fourth finger 80 illustrated in FIG. 4 in that the fourth finger 80 in FIG. 5 has greatly bent side surfaces 82 formed in an S-shape and an inwardly sloping surface 87 bounded by the side surfaces 82.

The fourth finger 80 illustrated in FIG. 5 is formed symmetrically with the third finger 70 illustrated in FIG. 5. In the end effector device 30 illustrated in FIG. 5, the height of the first finger 50 and the second finger 60 protruding from the opening 43 is substantially the same as the height of the third finger 70 and the fourth finger 80 protruding from the opening 43.

In the end effector device 30 illustrated in FIG. 5, the first gripper 100 and the second gripper 110 are selectively used depending on the dimensions of the work to be gripped.

According to the embodiment, a low-cost end effector device 30 enabled to handle a variety of works is provided.

In the description of the embodiment described above, various technically preferable limitations may be given to illustrate a preferred embodiment in the present disclosure. However, the technical scope of the present disclosure is not limited to the embodiment unless otherwise specified by descriptions limiting the present disclosure. That is, the elements of configuration in the above-described embodiments can be appropriately replaced with existing constituent elements or the like, and various variations including combinations with other existing constituent elements are possible. The descriptions of the above embodiment should not be construed as limitations on the contents of the disclosure described in the scope of claims.

For example, in the embodiment, the end effector device 30 includes the first gripper 100 and the second gripper 110 as illustrated in FIGS. 2 and 3, but the elements of configuration are not limited thereto. The end effector device 30 may include another gripper in addition to the first gripper 100 and the second gripper 110. That is, the end effector device 30 may include three or more pairs of fingers.

What is claimed is:
1. An end effector device comprising:
a housing having an opening;
a first gripper; and
a second gripper; wherein
the first gripper includes a first finger and a second finger facing each other and configured to open and close,
the second gripper includes a third finger and a fourth finger facing each other and configured to open and close in a direction intersecting the first gripper,
the first finger, the second finger, the third finger, and the fourth finger each protrude from the opening,
a maximum distance between the first finger and the second finger is shorter than a maximum distance between the third finger and the fourth finger,
the third finger and the fourth finger each have an elongated hook shape and a work contact surface, two greatly bent side surfaces formed in an S-shape, a back surface, a sloping surface, a top surface, a facing surface, and an inwardly sloping surface bounded by the side surfaces, and
for each of the third finger and the fourth finger
the work contact surface has a small rectangular shape,
each of the two side surfaces is in contact with the work contact surface, the back surface, the sloping surface, the top surface, and the facing surface, the back surface has a rectangular shape larger than the work contact surface and is in contact with the two side surfaces and the sloping surface, the sloping surface is in contact with the two side surfaces, the back surface, and the top surface, the top surface is in contact with the work contact surface, the two side surfaces, and the sloping surface, and the facing surface is in contact with the work contact surface and the two side surfaces.

2. The end effector device according to claim 1, wherein a length of the first finger and the second finger protruding from the opening is longer than a length of the third finger and the fourth finger protruding from the opening.

3. The end effector device according to claim 1, wherein the first finger and the second finger each have a work contact surface, and material of the work contact surfaces of the first finger and the second finger is different from material of the work contact surfaces of the third finger and the fourth finger.

4. The end effector device according to claim 1, wherein the first gripper and the second gripper are driven so as to simultaneously grip a common work.

5. A robotic device comprising:

the end effector device according to claim 1 and a robot hand device configured to drive the end effector device.

* * * * *